United States Patent [19]

Starck

[11] Patent Number: 4,622,579

[45] Date of Patent: Nov. 11, 1986

[54] METHOD AND APPARATUS FOR TRANSMITTING DIGITAL LUMINANCE AND CHROMINANCE TELEVISION SIGNALS

[75] Inventor: Alexander Starck, Munich, Fed. Rep. of Germany

[73] Assignee: Siemens Aktiengesellschaft, Berlin & Munich, Fed. Rep. of Germany

[21] Appl. No.: 598,681

[22] Filed: Apr. 10, 1984

[30] Foreign Application Priority Data

May 10, 1983 [DE] Fed. Rep. of Germany ....... 3317115

[51] Int. Cl.$^4$ ...................... H04N 5/38; H04N 11/02; H04N 7/13
[52] U.S. Cl. ..................................... 358/13; 358/135
[58] Field of Search .................. 358/13, 135, 138, 133; 375/25-27

[56] References Cited

U.S. PATENT DOCUMENTS

| | | | |
|---|---|---|---|
| 2,949,505 | 8/1960 | Kretzmer | 375/25 |
| 3,403,226 | 9/1968 | Wintringham | 375/27 |
| 3,439,753 | 4/1969 | Mounts | 375/25 |
| 3,996,607 | 12/1976 | Heitmann | 358/13 |
| 4,244,004 | 1/1981 | Yamada | 358/138 |

FOREIGN PATENT DOCUMENTS 964370  3/1975  Canada .

OTHER PUBLICATIONS

"Bit Rate Reduction to 140 Mbit/s from a Television Component Standard Requiring 216-228 Mbit/s," Wilson, Interim Report 111/81, Independent Broadcasting Authority.

"A Simple High Wuality DPCM-Codec for Video Telephony Using 8 Mbit Per Second," Bostelmann, NTZ, 1974, vol. 3, pp. 115-117.

"Digital Television Transmission With 34 Mbit/s", Burkhardt et al. SMPTE Journal, vol. 89, Apr. 1980, pp. 244-248.

Primary Examiner—Michael A. Masinick
Attorney, Agent, or Firm—Hill, Van Santen, Steadman & Simpson

[57] ABSTRACT

A method and apparatus for transmitting digital luminance and chrominance television signals utilize unchanged PCM codewords and PCM codewords which have been converted into DPCM codewords. The DPCM codewords each contain the difference between the scan values to which they are allocated and the scan values for the adjacent, unchanged PCM codewords. If the amplitude value of an unchanged PCM codeword is B and if the amplitude values of the adjacent PCM codewords are A and C, inverting registers are employed to invert the amplitude value B in relation to the other amplitude values. Adders then form different codewords with the amplitude values A-B and C-B which are encoded in DPCM coders. At the correct time a parallel-series register converts the unchanged PCM codeword and the newly formed DPCM codewords into a time division multiplex signal. Corresponding reconversion is undertaken at the receiving side.

7 Claims, 2 Drawing Figures

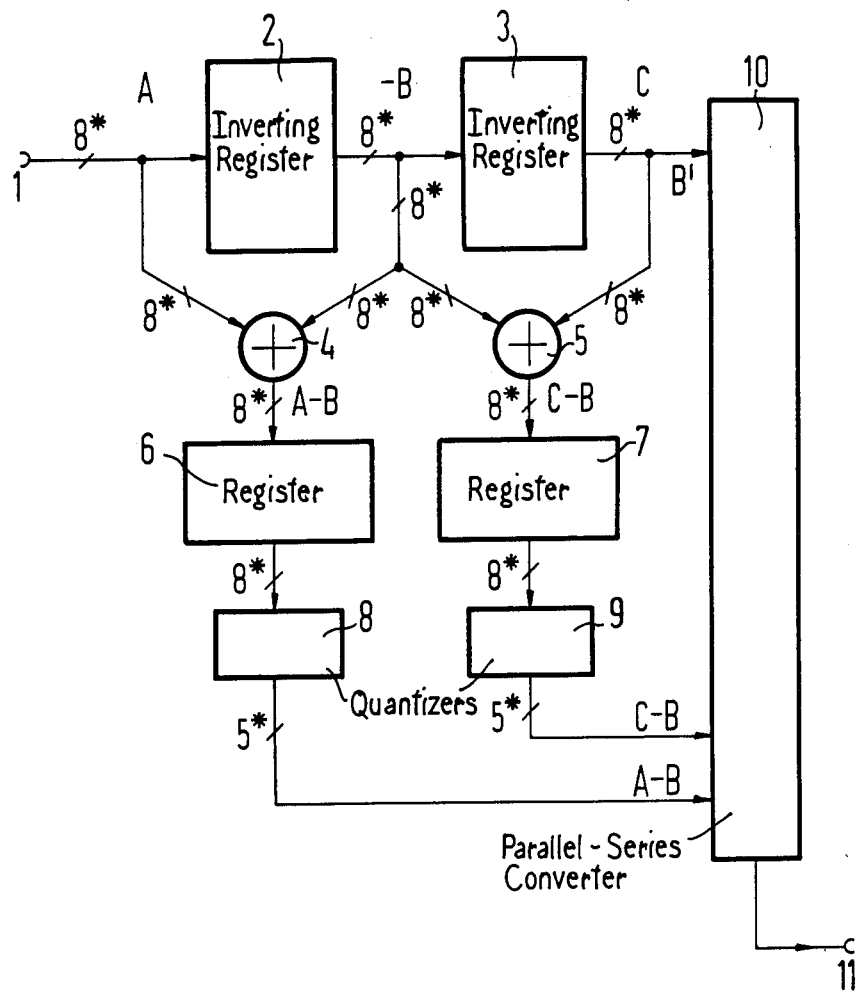

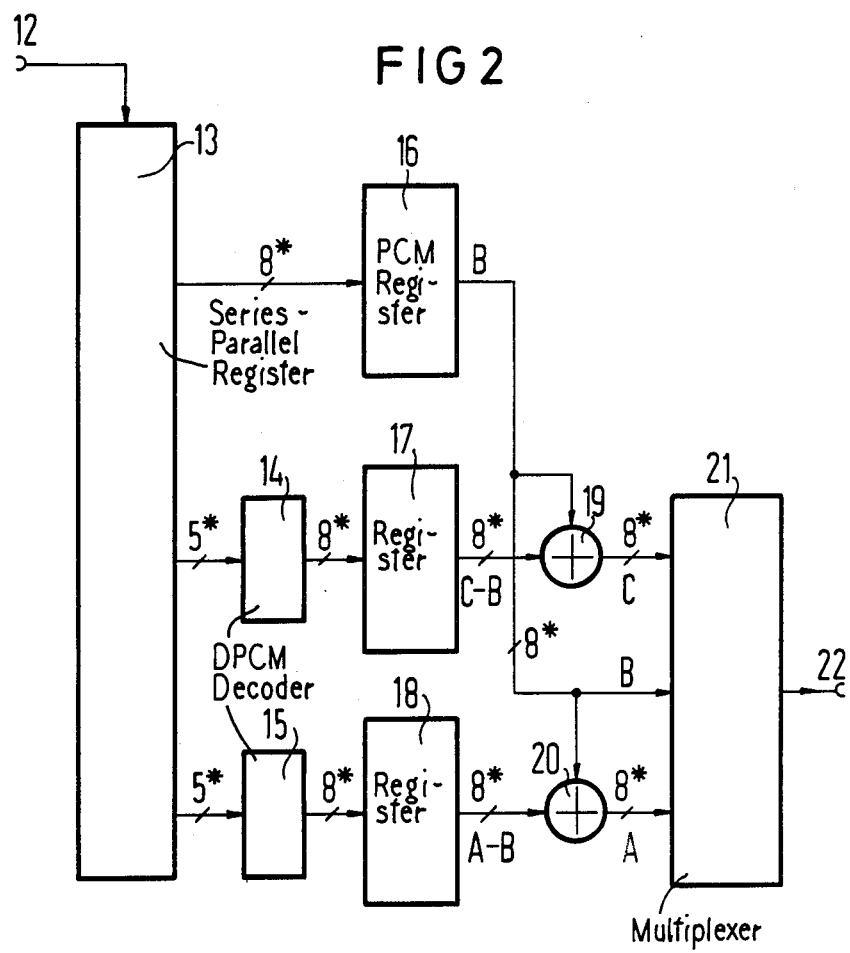

METHOD AND APPARATUS FOR TRANSMITTING DIGITAL LUMINANCE AND CHROMINANCE TELEVISION SIGNALS

BACKGROUND OF THE INVENTION

1. Field of the Invention

The present invention relates to a method and apparatus for transmitting digital luminance and chrominance television signals, and in particular to such a method and apparatus wherein the pulse code modulated (PCM) codewords for each image row, which contain scan values, in accordance with a predetermined pattern either remain PCM codewords for transmission or are converted into shorter difference pulse code modulated (DPCM) codewords.

2. Description of the Prior Art

The concept of utilizing PCM and DPCM codewords for transmitting digital luminance and chrominance television signals is described, for example, in "Bit Rate Reduction To 140-Mbit/s From A Television Component Standard Requiring 216–228 Mbit/s," Wilson, Interim Report 111/81, Independent Broadcasting Authority, and is known as Hybrid DPCM.

The problem of selecting suitable coding arises in the digital transmission of television signals. If a color television signal which is processed in the studio with a 13.5 MHz clock pulse frequency and 8 bits per scan value is to be transmitted over digital channels at a data rate of 140 Mbit/s, it is necessary to reduce either the clock pulse frequency or the number of bits per image point. If the clock pulse frequency for the luminance is reduced to 11.25 MHz, in order to transmit below 140 Mbit/s it is additionally necessary to reduce the chrominance resolution in the vertical direction, which may visually impair the image quality.

By using DPCM in which each image point is coded with 6 bits, it would be possible to retain the spatial resolution, however, a disadvantage of this type of coding is the increased susceptibility to transmission disturbances and the circuit outlay necessary for such high clock pulse frequencies.

Susceptibility to transmission disturbances could be reduced by utilizing known hybrid DPCM, however, because a weighted mean of a number of scan values contained in the PCM codewords, which remain unchanged, serves as an estimated value for the formation of the DPCM codewords, the circuit outlay is not reduced.

SUMMARY OF THE INVENTION

It is an object of the present invention to provide a method and apparatus for transmitting digital luminance and chrominance television signals having reduced susceptibility to transmission disturbances.

It is a further object of the present invention to provide such a method and apparatus realizable with minimal circuit outlay.

The above objects are inventively achieved in a method and apparatus wherein an encoding pattern is selected such that at the transmit side a DPCM codeword is generated on both sides of each unchanged PCM codeword (at least in the horizontal direction) these DPCM codewords being allocated only to this center PCM codeword. The DPCM codewords are formed from the difference between the scan value which is directly adjacent in the horizontal, vertical or diagonal direction and which has been converted into a PCM codeword and the current scan value. The PCM codewords and the DPCM codewords are interleaved image row-by-image row to form a first time division multiplex signal and are transmitted. The PCM and DPCM codewords are separated again at the receiving side and the DPCM codewords are reconverted into PCM codewords. The unchanged PCM codewords and the reconverted PCM codewords are interleaved image row-by-image row to form a second time division multiplex signal.

The PCM codewords may consist of eight digits and the DPCM codewords may consist of five digits. The latter can be transmitted without a sign because they can be supplemented at the receiver since the scan values allocated to the DPCM codewords must lie within the value range (as described in "NTZ," 1974, Volume 3, pages 115–117). If a DPCM codeword is affected by an error, only the associated image point is falsified. If the error affects the PCM codeword, in addition to the associated image point, adjacent points which are dependent upon its scan value are also falsified.

A transmitter for undertaking the above-described process with alloction only in the horizontal direction has a chain including a first inverting register having inputs connected to a signal source, a first adder having first inputs connected to the inputs of the first inverting register and second inputs connected to the outputs of the first inverting register, a first register having inputs connected to the outputs of the first adder, and a first DPCM coder (quantizer) having inputs connected to the outputs of the first register. The apparatus includes a second chain having a second inverting register having inputs connected to the outputs of the first inverting register, a second adder having first inputs connected to the inputs of the second inverting register and having second inputs connected to the outputs of the second inverting register, a second register having inputs connected to the outputs of the second adder, and a second DPCM coder (quantizer) having inputs connected to the outputs of the second register. The apparatus further includes a parallel-series register having inputs connected to the outputs of the second inverting register, the first DPCM coder, and the second DPCM coder. The output of the parallel-series register is the output for the transmitter.

A receiver for completing the above-described process with allocations only in the horizontal direction has a series-parallel register having an input which is the input for the receiver. The receiver has a third register having inputs connected to the outputs of the series-parallel register. First DPCM decoder has inputs connected to additional outputs of the series-parallel converter. A fourth register has inputs connected to the outputs of the first DPCM decoder and a fourth adder has first inputs connected to the outputs of the fourth register and second inputs connected to the outputs of the third register. The receiver has a second DPCM decoder having inputs connected to the remaining outputs of the series-parallel register. A fifth register has inputs connected to the outputs of the second DPCM decoder. A fourth adder has first inputs connected to the outputs of the fifth register and second inputs connected to the outputs of the third register. A multiplexer is connected at its input end to the outputs of the third register, the third adder and the fourth adder. The output of the multiplexer functions as the output for the receiver.

Because no loops are present in either the transmitter or the receiver, signal processing can taken place utilizing relatively slow technology.

A further advantage of the above-described process is that the coding and decoding can be repeatedly undertaken in series without problem. This means that if a difference is coarsely quantized at the image edges, and error of up to one-half of the gradation level may be added to the decoded image point prior to the next coding. Upon the occurrence of the next coding, the difference is nonetheless quantized to the same value as during the previous coding.

DESCRIPTION OF THE DRAWINGS

FIG. 1 is a block diagram of a transmitter constructed in accordance with the principles of the present invention for practicing the method disclosed herein.

FIG. 2 is a block diagram of a receiver constructed in accordance with the principles of the present invention for practicing the method disclosed herein.

DESCRIPTION OF THE PREFERRED EMBODIMENTS

A transmitter constructed in accordance with the principles of the present invention is schematically shown in FIG. 1. The transmitter has a signal input 1 connected to the inputs of an inverting register 2 as well as to the first inputs of an adder 4. In FIG. 1 (as well as in FIG. 2) the numbers followed by asterisks adjacent to the data lines indicate the number of digits carried by those lines. For example, the symbol 8* adjacent the input line indicates an 8 digit input. The transmitter also includes an inverting register 3 having inputs connected to the outputs of the inverting register 2, and an adder 5 having first inputs connected to the outputs of the inverting register 2 and having second inputs connected to the outputs of the inverting register 3. The outputs of the adders 4 and 5 are respectively connected to register 6 and 7, the outputs of which are respectively connected to quantizers or DPCM coders 8 and 9. The outputs of the quantizers 8 and 9 are both supplied to inputs of a parallel-series converter 10, the output 11 of which serves as the output for the transmitter.

Operation of the transmitter is as follows. The PCM codewords of an image row are supplied to the input 1 in parallel. As an example, a PCM codeword with the scan value A is present at the inputs of the inverting register 2, a PCM codeword with the scan value B is present at the inputs of the inverting register 3, and a PCM codeword with the scan value C is present at the outputs of the inverting register 3. The adder 4 forms a codeword with an amplitude value (A-B), and the adder 5 forms a codeword with the amplitude value (C-B). These codewords are fed into the registers 6 and 7 and are subsequently converted into five digit DPCM codewords in the quantizers 8 and 9. From the unchanged PCM codeword and the newly formed DPCM codewords (as soon as these are all present), the parallel-series converter 10 forms a time division multiplex signal which is present at the output 11. The parallel-series converter 10 is loaded whenever the PCM codeword for the image point B (referenced B' to designate a time-based delimitation in relation to C) is present at its first input and the two DPCM codewords for (A-B) and (C-B) are present at its other inputs.

A receiver constructed in accordance with the principles of the present invention is shown in FIG. 2. The receiver has a signal input 12 leading directly to a series-parallel register 13. A first set of outputs of the register 13 is connected to the inputs of a PCM register 16, the outputs of which are supplied to the first inputs of adders 19 and 20. The remaining two sets of outputs of the series-parallel register 13 are respectively connected to the inputs of DPCM decoders 14 and 15 (which contain ROMs). The outputs of the decoders 14 and 15 are respectively connected to the inputs of registers 17 and 18, and the outputs of those registers are respectively supplied to the second sets of inputs of the adders 19 and 20. The outputs of the adders 19 and 20 and the outputs of the register 16 are all supplied to a multiplexer 21, the output 22 of which functions as the output for the receiver.

Operation of the receiver shown in FIG. 2 is as follows. The time division multiplex signal emitted at the output 11 of the transmitter in FIG. 1 is fed to the input 12 of the receiver shown in FIG. 2. The signal is supplied to the series-parallel register 13 which separates the PCM codeword and the DPCM codewords. The PCM codeword is supplied to the register 16, whereas the DPCM codewords are supplied to the registers 17 and 18, having been decoded in the DPCM decoders 14 and 15 in the form of difference codewords (C-B) and (A-B). The adder 19 adds the PCM codeword having the scan value B supplied from the output of the register 16 and the difference codeword at the output of the register 17 having the amplitude value (C-B) and emits a PCM codeword having the scan value C.

The adder 20 adds the PCM codeword having the scan value B supplied from the output of the register 16 and the difference codeword at the output of the register 18 having the scan value (A-B) and emits a PCM codeword having the scan value A. The multiplexer 21 interleaves the PCM codewords having the scan values A, B and C to form a time division multiplex signal which appears at the output 22.

Although the components shown in FIG. 1 and FIG. 2 may be selected by those skilled in the art in order to meet individual requirements without departing from the inventive concept disclosed and claimed herein, a transmitter and receiver may be constructed in accordance with the principles of the present invention utilizing the following commercially available integrated circuits by way of example:

| Reference Symbol | Integrated Circuit |
| --- | --- |
| 2, 3 | 74ALS 534 |
| 4, 5, 19, 20 | 2 · 74 LS 283 |
| 6, 7, 16, 17, 18 | 74 LS 273 |
| 8, 9 | TBP 18 S 22 |
| 10 | 3 · 74 LS 166 A |
| 13 | 3 · 74 LS 164 |
| 14, 15 | TBP 18 S 030 |
| 21 | 2 · 74 LS 604 |

Although modifications and changes may be suggested by those skilled in the art it is the intention of the inventor to embody within the patent warranted hereon all changes and modifications as reasonably and properly come within the scope of his contribution to the art.

We claim as our invention:

1. A method for transmitting digital luminance and chrominance television signals generated in the form of a sequence of PCM codewords containing scan values for each image row comprising the steps of:

selecting PCM codewords in a pattern in said sequence;

generating a DPCM codeword on both sides of each selected PCM codeword at least in the horizontal direction, said DPCM codewords being formed from the difference between a current selected PCM codeword and the PCM codeword occurring directly horizontally, vertically, or diagonally adjacent thereto;

interleaving said PCM codewords and said DPCM codewords image row-by-image row to form a first time division multiplex signal;

transmitting said first time division multiplex signal;

receiving said first time division multiplex signal and separating said PCM and said DPCM codewords at a receiver;

reconverting said DPCM codewords into PCM codewords; and interleaving the unchanged received PCM codewords and the reconverted DPCM codewords image row-by-image row to form a second time division multiplex signal.

2. An apparatus for transmitting digital luminance and chrominance television signals generated in the form of a sequence of PCM codewords containing scan values for each image row, said apparatus having a transmitter and receiver, said transmitter comprising a means for selecting PCM codewords in a pattern in said sequence, a means for generating a DPCM codeword on both sides of each selected PCM codeword in the horizontal direction, said means for generating said DPCM codeword forming the difference between a current selected PCM codeword and the PCM codeword directly horizontally, vertically or diagonally adjacent thereto, a means for interleaving said PCM codeword and DPCM codeword image row-by-image row for forming a first time division multiplex signal, and a means for transmitting said first time division multiplex signal; and said receiver comprising a means for receiving said first time division multiplex signal, a means for separating the received PCM and DPCM codewords, a means for reconverting said DPCM codewords into PCM codewords, and a means for interleaving the unchanged received PCM codewords and the reconverting DPCM codewords image row-by-image row for forming a second time division multiplex signal.

3. An apparatus for transmitting digital luminance and chrominance television signals as claimed in claim 2 wherein said means for generating a DPCM codeword on both sides of each PCM codeword comprises:

a first inverting register having inputs for receiving the PCM codewords from an image row;

a second inverting register having inputs connected to the outputs of said first inverting register;

a first transmitter adder having a first set of inputs connected to the inputs of said inverting register and a second set of inputs connected to the outputs of said first inverting register;

a second transmitter adder having first inputs connected to the inputs of said second inverting register and second inputs connected to the outputs of said second inverting register;

said first and second transmitter adders respectively forming first and second difference values;

first and second transmitter registers having inputs respectively connected to the outputs of said first and second transmitter adders; and first and second quantizers having inputs respectively connected to the outputs of said first and second transmitter registers, each quantizer forming a DPCM codeword from one of said difference values.

4. An apparatus for transmitting digital luminance and chrominance television signals as claimed in claim 3 wherein said means for interleaving said PCM codewords and DPCM codewords is a parallel-series converter having inputs respectively connected to the outputs of said second inverting register and said first and second quantizers, and having an output at which said first time division multiplex signal is present.

5. An apparatus for transmitting digital luminance and chrominance television signals as claimed in claim 2 wherein said means for separating said PCM and said DPCM codewords is a series-parallel register having an input oonnected to said means for receiving said first time division multiplex signal and having a set of PCM outputs, and two sets of DPCM outputs at which said DPCM codewords allocated to said PCM codeword therebetween are present.

6. An apparatus for transmitting digital luminance and chrominance television signals as claimed in claim 5 wherein said means for reconverting said DPCM codewords into PCM codewords comprises:

a PCM register having inputs connected to said PCM outputs of said series-parallel register;

first and second DPCM decoders having inputs respectively connected to said two sets of DPCM outputs of said series-parallel register for decoding said DPCM codewords;

first and second receiver registers having inputs respectively connected to the outputs of said first and second DPCM decoders;

a first receiver adder having first inputs connected to the outputs of said PCM register and second inputs connected to the outputs of said first receiver register; and a second receiver adder having first inputs connected to the outputs of said PCM register and second inputs connected to the outputs of said second receiver register, said first adder forming one component at its outputs of one of said difference values and said second adder forming another component at its outputs of the other of said difference values.

7. An apparatus for transmitting digital luminance and chrominance television signals as claimed in claim 6 wherein said means for interleaving the unchanged received PCM codewords and the reconverted DPCM codewords is a multiplexer having inputs respectively connected to the outputs of said first and second receiver adders and the outputs of said PCM register and having an output at which said second TDM signal is present.

* * * * *